C. W. BROWN.
MACHINE FOR FORMING AND AFFIXING FASTENING DEVICES.
APPLICATION FILED MAY 19, 1915.
1,193,113.
Patented Aug. 1, 1916.
3 SHEETS—SHEET 1.
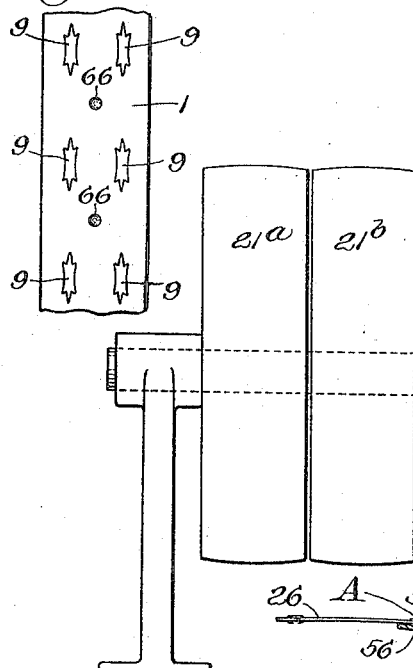
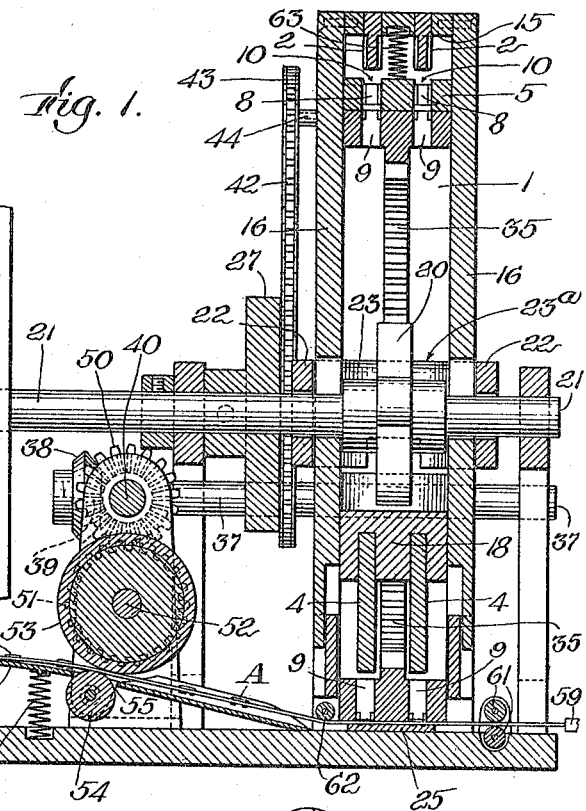
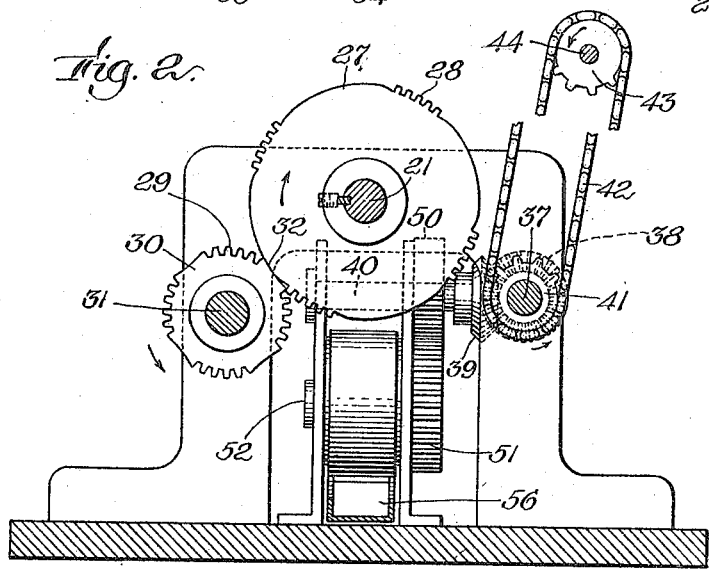
Inventor:
Carlton W. Brown,

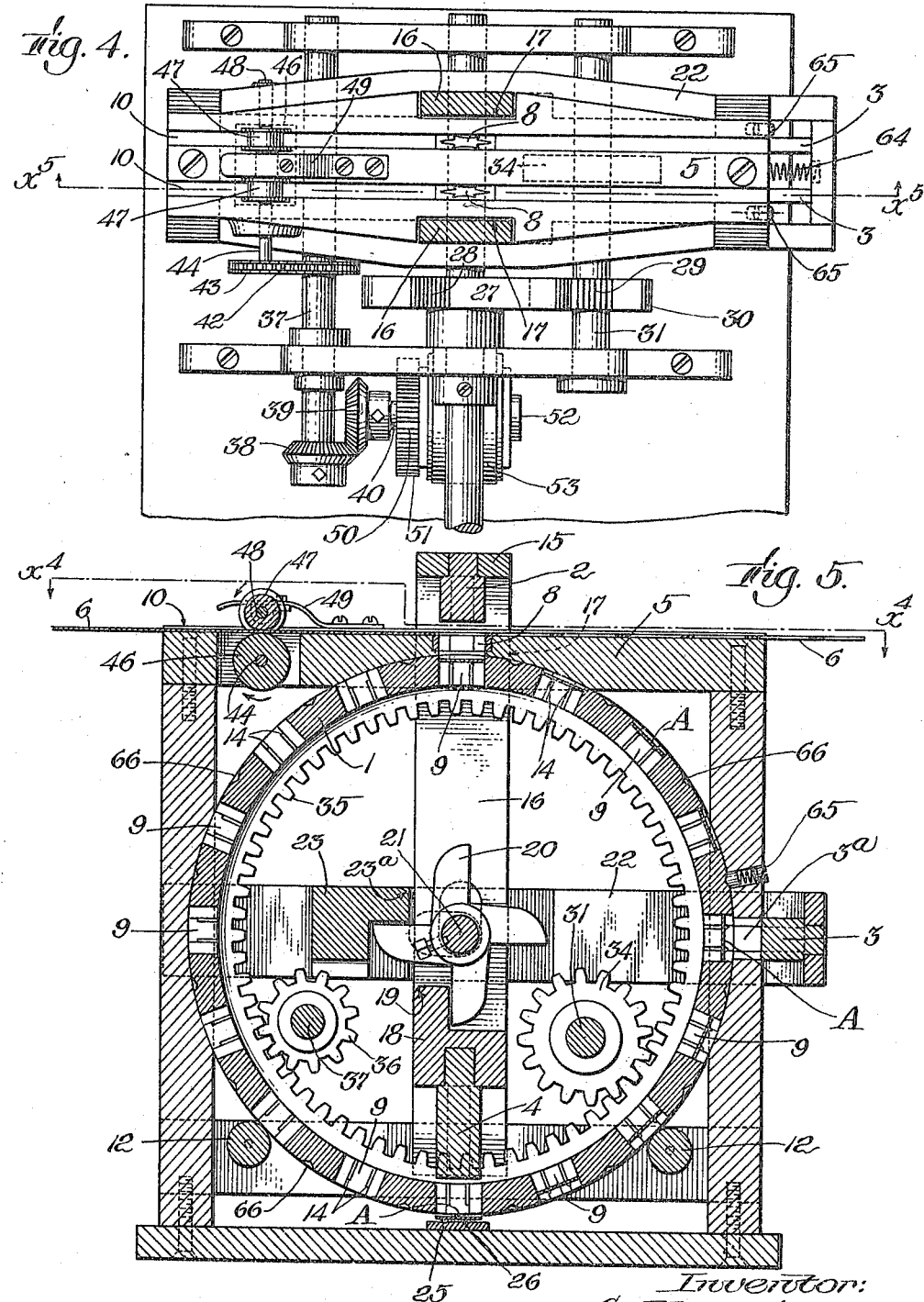

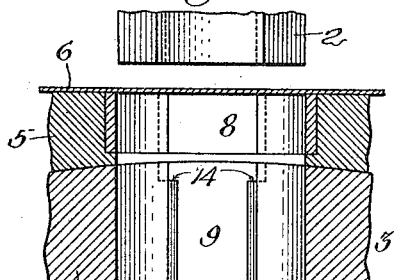
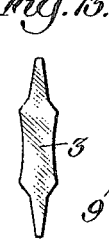
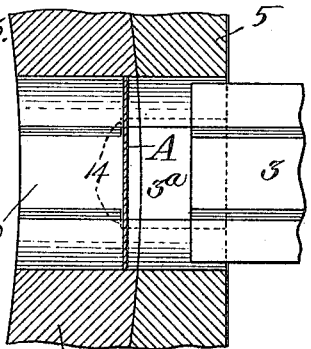
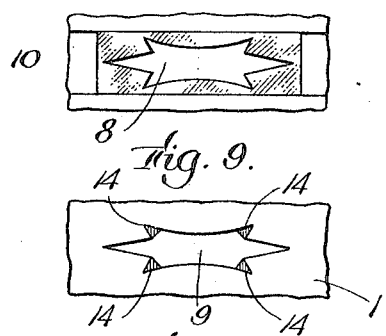
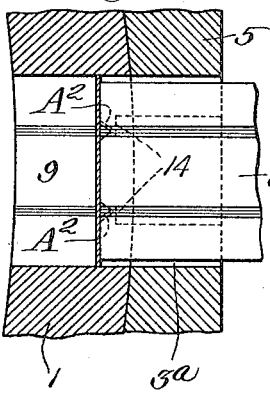
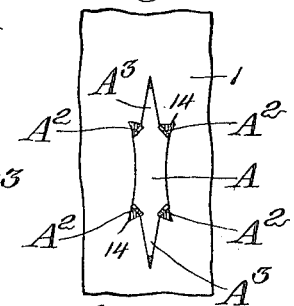
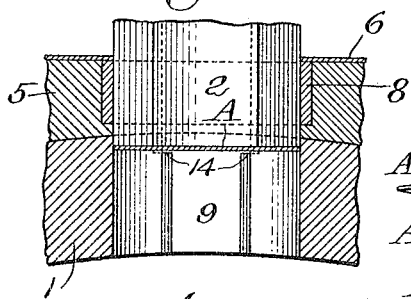
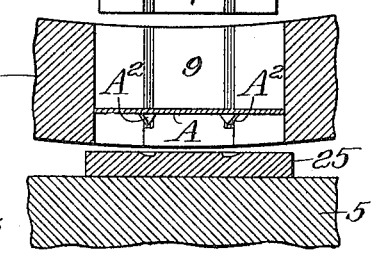
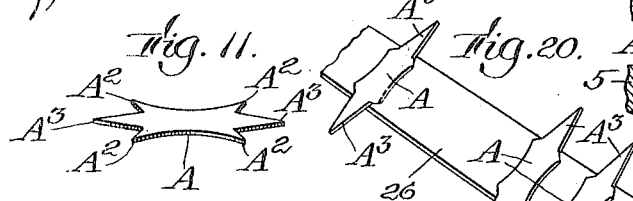
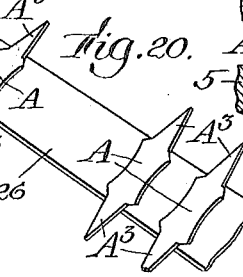
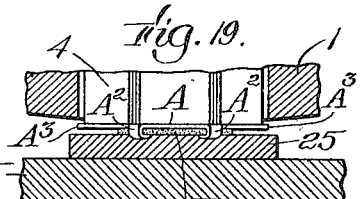

UNITED STATES PATENT OFFICE.

CARLTON W. BROWN, OF GROTON, CONNECTICUT.

MACHINE FOR FORMING AND AFFIXING FASTENING DEVICES.

1,193,113.  Specification of Letters Patent.  Patented Aug. 1, 1916.

Application filed May 19, 1915. Serial No. 29,235.

*To all whom it may concern:*

Be it known that I, CARLTON W. BROWN, a citizen of the United States, residing in Groton, in the county of New London and State of Connecticut, have invented an Improvement in Machines for Forming and Affixing Fastening Devices, of which the following description, in connection with the accompanying drawings, is a specification, like numerals on the drawings representing like parts.

The present invention relates to a machine for forming and affixing fastening devices to tags, labels and the like; and is shown as embodied in a machine especially adapted to be used in making laundry tags of the kind which consist of strips of tape or other fabric which are provided, as a part thereof, with fastening devices, so that they may be permanently or temporarily fastened to the goods which are to be identified. The finished tags, while especially intended for use in laundries may be adapted for other uses, and consist of material capable of being marked, combined with fastening devices permanently secured; and provided with means whereby they may be utilized to secure the tags as a whole to other objects or materials for identification.

In accordance with the invention the fastening devices are formed from a strip or ribbon of suitable metal which is fed through the machine by an intermittent feed movement, the machine being provided with traveling holders for the blanks originally cut from the said strip, said holders being preferably carried on the surface of a rotating wheel which also has an intermittent feed movement. Coöperating with the said holders and with a stationary cutting die, there are reciprocating punches; there being in the construction shown, three of said punches, the first of which is adapted to cut from the strip of metal the original blank from which the fastening device is formed, while the second bends up the prongs which constitute the means for securing the fastening device to the fabric strip, while the third punch completes the operation by forcing the device into engagement with the fabric and clenching the prongs. By using a rotating wheel for the blank carrier, and supplying the metal and fabric at different points near the periphery thereof, the said metal blank is reversed in its position between the strip of metal and the strip of fabric so that the punch which first cuts out the blank and the punch which finally affixes and clenches the fastening device in the fabric can operate in the same direction, with relation to the machine, but on opposite sides of the blank; while the prong forming punch can operate at an angle thereto, thus simplifying the construction. The blank cutting punch and the affixing punch can therefore be mounted on a single reciprocating carrier, while the prong forming punch is movable transversely thereof, so that all the punching operations can be provided for by a cam or cams mounted on a single shaft concentric with the blank carrying wheel. The shaft which carries the cams can be rotated continuously, and the intermittent feed movements of the metal strip, the blank carrying wheel and the fabric can all be operated through the agency of a counter shaft connected to the main shaft by an intermittent gearing.

In the construction shown, the blank carrier which is externally supported is provided with an internal gear which coöperates with an ordinary spur gear on an intermittingly driven counter shaft, the timing being such that the blank carrying wheel stands stationary while the cam engages and operates the punch members which extend diametrically across the wheel, and operate through the periphery thereof. The feed of the metal strip as well as the feed of the fabric may be provided for by gears driven by the internal gear of the die carrying wheel so that the necessary intermittent operation is very simply provided for.

The blank holders or pockets in the wheel are all shaped alike, the outer opening of each pocket being of the shape of the original blank, which has four small fastening prongs whereby it is attached to the tag, and two longer prongs which are left flat for the purpose of subsequently affixing the tag to the goods to be identified. Below the outer surface of each pocket, however, there are shoulders of the shape of the small prongs, so that when the blank is cut out, it is pushed into the pocket, and left there when the punch returns, being supported by the prongs which rest on the said shoulders.

The first punch is of the shape of the blank, the said punch passing through the stationary cutting die, and pushing the cut blank into the pocket where it rests on the shoulders above described.

The second punch which operates at right angles to the first, but in the same direction relative to the blank, differs in shape from the first punch in that the projections which cut the small prongs are omitted. The said second punch has a movement sufficiently long to force the punch into the pocket beyond the shoulders therein, thereby upsetting the prongs and leaving the blank in the pocket below the shoulders with the prongs standing outwardly.

The third punch which operates in the opposite direction relative to the blank, is the same in shape as the second punch so that it can enter the pocket from the opposite direction; and passing through the same, force the blank with its outwardly projecting prongs toward the fabric which at this point is fed across the face of the wheel so that the said prongs are forced through the fabric and clenched by a suitable clenching plate adjacent to the periphery of the wheel. It is to be understood of course that the pockets extend wholly through the periphery of the wheel, being open at both ends, the first two punches entering from the front and the last one entering from the back.

Figure 1 is a vertical section of a machine embodying the invention taken in line with the main driving shaft; Fig. 2 is a transverse section of the lower portion of the same; Fig. 3 is a plan view of a portion of the surface of the blank carrying wheel; Fig. 4 is a horizontal section on line $x^4$ of Fig. 5; Fig. 5 is a transverse section taken on the line $x^5$ of Fig. 4; Fig. 6 is an enlarged sectional detail showing the upper punch, the stationary die and the blank carrying wheel as they stand prior to the first shaping operation; Fig. 7 is a face view of the punch which performs the first operation; Fig. 8 is a plan view of the stationary die formed in the frame of the machine which coöperates with the punch in cutting the blank from the strip of metal; Fig. 9 is a plan view of one of the pockets in the wheel; Fig. 10 is a view similar to Fig. 6 but showing the parts in the position assumed after the blank has been cut out and inserted in the pocket; Fig. 11 is a perspective view of the blank as first formed; Fig. 12 is a plan view of a guide opening formed in the frame opposite the second punch; Fig. 13 is a face view of the punch which performs the second operation; Fig. 14 is a detail in section through the wheel and the frame, showing the parts in the position assumed at the time of the second operation; Fig. 15 is a view similar to Fig. 14 showing the parts in the position assumed at the end of the second operation; Fig. 16 is a face view of the die carrying wheel with the blank therein at the end of the second operation; Fig. 17 is a perspective view of the blank as formed at the end of the second operation; Fig. 18 is a section showing the parts at the beginning of the final operation; Fig. 19 is a similar view showing the parts at the finish of the final operation; and Fig. 20 is a perspective view of the finished article; Figs. 7 to 20 inclusive are on the same enlarged scale as Fig. 6.

The primary elements of the machine consist of the intermittingly rotating carrier 1 which receives the blanks and carries them from point to point in the successive operation, and the punches 2, 3 and 4 which operate on the blanks in conjunction with the carrier. These parts are mounted in a suitable frame 5, the upper portion of which constitutes a support for the strip or strips of metal 6 from which the blanks are cut; and the same frame is also provided with slide bearings for the punches and the punch carrying members. The said frame is also provided with the female cutting die 8, Fig. 5, which coöperates with the punch 2 in cutting out the blank from the strip 6, the shape of the cutting edge of said die being shown in Fig. 7.

For a purpose to be hereinafter described, means are provided for operating at the same time on two of the strips 6 of metal, and the punches 2, 3, and 4 are duplicated as indicated in the drawings, so that two blanks are punched out at each initial operation. The carrier wheel 1 which is provided with pockets 9 to receive the blanks and also to coöperate in the subsequent operations thereon, lies below the top of the frame, which is provided with parallel channels 10, Fig. 1, to carry two strips of metal at once into position over the stationary dies 8, and the pockets 9 are also duplicated, there being such pockets side by side along the periphery of the wheel as shown in Fig. 3. As these parts are duplicates of each other, reference will mainly be made in the following description to one set of parts only, in order to avoid confusion.

The frame 5 is shown as rectangular, having internal recesses which form a guide for the rotating wheel 1, the said wheel, or more strictly speaking, annulus, being wholly externally supported upon rollers 12 which have suitable bearings in the frame. The pockets 9 extend completely through the wheel and each is shaped at the periphery of the wheel as indicated in Fig. 9, the outer portion of said pocket however, extending only part way through the wheel and having below the surface of the wheel, shoulders 14 shaped to correspond to the fastening prongs of the blank, which shoulders are adapted to support the blank as originally cut out by the punch 2 and stationary die 8.

The punches 2 are mounted on a cross head 15 carried by a reciprocating member which consists of a frame, the sides 16 of which are supported in slide bearings 17 in the frame at opposite sides of the wheel, and connected together inside of the wheel by a cross member 18 which has a cam surface 19 adapted to be engaged by a cam 20 mounted on a shaft 21 which is concentric with the wheel.

In the first step in the operation, the cam 20 produces a downward movement of the reciprocating member thus forcing the punches 2 against the surface of the metallic ribbons 6 in which coöperation with the female dies 8, Fig. 8, cut blanks A of the shape shown in Fig. 7, and force the same through the openings in the frame into the adjacent pockets 9, where the blanks rest upon the shoulders 14, as may be best understood by reference to Fig. 9. To avoid confusion, the operation will hereinafter be described by reference to only one of the blanks, it being understood that in the construction shown two blanks are acted on simultaneously at each step. The blanks, as shown, are provided with short clenching prongs A², by which they are fastened to the fabric, and with long prongs A³ which are left unbent in the finished tags.

The next step in the operation consists in bending up the prongs A² which rest on the shoulders 14 and support the blank in the position shown in Fig. 14. This bending operation is accomplished by the reciprocation of the punch 3, the shape of which is shown in Fig. 13. The punch 3 is carried by a reciprocating frame which has the side members 22 bearing in the uprights of the frame and the cross member 23 provided with the cam surface 23ª which extends through the wheel 1, so as to be actuated by the cam 20 as described in connection with the operation of the punch 2. This punch 3 is arranged to pass farther into the pocket than the punch 2 so that when reciprocated, it will pass through a suitable guideway, 3ª (Figs. 5 and 12) in the frame 5 into the pocket in the wheel until it engages the surface of the blank therein and forces the blank farther into the pocket, thereby causing the parts which rest on the shoulders 14 to be bent up as indicated in Fig. 15. The blank is then of the shape shown in Fig. 17. As shown, the punch and its guideway are smaller than the pocket to allow for the thickness of the metal prongs; and if the blank tends to stick to the punch as it is withdrawn from the pocket, the edge of the guideway will strip it from the punch.

The next operation consists in forcing the blank out of the pocket toward the periphery of the wheel as best shown in Figs. 18 and 19. Assuming that in the progressive operation of the wheel, the pocket containing the blank has been moved to the bottom of the wheel as shown in Fig. 5, the said blank is pushed out of the said pocket by the punch 4 which passes through the said pocket from the rear thereby acting upon what was originally the under surface of the blank. The punch 4 is mounted on the under side of the cross member 18 of the reciprocating member which carries the punch 2, the shape of the punch 4 being the same as that of the punch 3 shown in Fig. 13. When the punch carrying member moves downward to operate the punch 2 and cut the blank it also operates the punch 4 so that said punch enters the back of the pocket then at the bottom of the wheel and engages the back of the completely formed blank. This action, as indicated in Figs. 18 and 19, pushes the blank out of the pocket from the position shown in Fig. 18 to that shown in Fig. 19 thus forcing the blank toward a suitably shaped anvil 25. The fabric to which the fastening devices are to be secured is fed through the machine between the anvil and the wheel, at this point, so that the prongs are forced through the fabric and clenched therein, as shown in Fig. 20.

For the purpose of continuously carrying out the steps necessary for the production of the finished blank and the tag which forms the final output of the machine, the shaft 21 which constitutes the primary operating device for the machine is shown as provided with fast and loose pulleys 21ª and 21ᵇ in the usual way the shaft 21 being continually rotated throughout the operation of the machine. The said shaft, as previously stated, has the cams 20 fixed thereon, and in the construction shown there are four cam members operating on the two punch carrying members so that sixteen staples are made from each strip of metal at each revolution of the wheel. As arranged for the two simultaneously fed strips of metal and fabric, the wheel is provided with thirty-two pockets so that thirty-two fastening devices are completed, in pairs, and set in pairs in each rotation of the wheel, the three pairs of punches acting simultaneously after each feed movement.

The feeding mechanism which provides for the feeding of the blank carrying wheel, the metal strips 6 and the strips of fabric 26 is provided for as follows: The shaft 21 which rotates continuously and carries the cams 20 is provided with an intermittent gear 27 having four sets of teeth, which are adapted to engage intermittingly with corresponding sets of teeth formed in a coöperating gear member 30 mounted on a counter shaft 31. Between the teeth the members 27 and 30 are provided with engaging surfaces 32 which bear against and fit each other so that while the shaft 31 is stationary it is positively prevented from lost motion. In the construction shown the shaft 31 makes a quarter turn each time the gear teeth come into engagement but dwells between turns, while the main shaft continues its rotation and operates the two punch members while the shaft 31 is stationary. When the continually moving shaft 21 is in the position shown in Fig. 2, the cams 20 are in the position shown in Fig. 5 so that during approximately the next quarter turn of the shaft 21 while the teeth 28 and 29 are in mesh and the shaft 31 is turning, one of the cams 20 will reach the cam surface 19, while another of said cams will reach the cam surface 23ª, ready to operate simultaneously the punches 2 and 4 on one member and the punch 3 on the other. During this interval, the shaft 31 has been caused to make approximately a quarter turn, advancing the wheel the distance between adjacent pockets, and also causing the metal strip and the fabric to be advanced the distance desired.

The feed movement of the blank carrying wheel is provided for by means of a gear 34, Fig. 5, mounted on a shaft 31, and meshing with an internal gear 35 formed on the inner surface of the carrier. The gear ratio is such that a quarter turn of the shaft 31 will advance the carrier the distance between adjacent pockets where it will stand during the quarter turn of the main shaft 21 which takes place while the gears 28 and 29 are not in mesh.

The feed of the metal strip, which takes place at the same time, is provided for through the agency of the following train of gears: A spur gear 36 mounted on a shaft 37 is also in mesh with the gear 35 and the said shaft 37 has connected therewith, as best shown in Fig. 1, a bevel gear 38 which is in mesh with a bevel gear 39 on a transverse shaft 40. The said shaft is also shown as provided with a sprocket wheel 41 which is connected by a chain 42 with a sprocket wheel 43 mounted on a shaft 44 located below the channels into which the metal strips are fed. The shaft 44, as best shown in Fig. 5, carries a feed roll 46 which engages the under side of the metal strip which is held in frictional engagement with said roll, by means of a presser roll 47 mounted on a shaft 48 and adapted to be pressed into engagement with the upper surface of the metal by means of a spring. The gear ratio in this case is such that the metal is fed forward a distance equal to the length of the blank which is to be cut from the strip.

In order to feed the fabric into which the staples are to be set, the shaft 40 is also provided with a spur gear 50 which meshes with a gear 51 mounted on a shaft 52 which carries a presser roll 53 coöperating with an idler roll 54 mounted in a bearing 55 in a spring supported guideway 56 for the strip of fabric 26. The spring 58 tends to lift the said guideway and to hold the idler roll 54 in frictional engagement with the fabric which lies between the rolls, and is therefore fed forward a certain distance each time the said rolls are operated. In the construction shown, the fabric is adapted to be delivered through a folding device 59 from which it is drawn across the machine between the periphery of the blank carrier and the surface of the clenching anvil 25 (Figs. 1, 19 and 20) which also lies adjacent to the carrier wheel. In order to guide the fabric, the rolls 61 and 62 are shown at opposite sides of the blank carrying wheel.

Taking the parts as shown in Figs. 2 and 5, it will be seen that the feed movements above described take place while the cam members are traveling from the position shown to a position in which they engage respectively the cam surface 19 and 23ª. In the next quarter turn of the shaft 21, during which there is no movement of the feeding gears, the punch member 16 will be moved positively downward, and the punch member 22 to the left, so that the punch 2 which cuts the blank and the punch 3 which turns up the prongs, and the punch 4 which forces the blank into the fabric will operate simultaneously. The said punches are operated by the positive cam movements, and as soon as released by the cams, they are returned to the position shown in Fig. 5 through the agency of restoring springs 63, Fig. 1, and 64, Fig. 4.

In order to positively position the wheel between feed movements, I have shown the frame as provided with a spring retaining device 65 for the carrier, the point of which retaining device is adapted to engage notches 66 formed between adjacent pockets on the periphery of the carrier wheel.

As above mentioned, the machine is arranged to operate on two sets of fastening devices at the same time, the punches and their corresponding parts being duplicated, as clearly indicated in Figs. 1 and 4. One purpose of this arrangement is to set the fastening devices in the fabric in pairs comparatively close together, leaving a longer space between the pairs than between the members of each pair. The reason for this is that the tag which the machine is especially intended to produce is provided with staples near the ends thereof leaving the body of the tag for identifying marks. When, therefore, the strip of fabric is delivered from the machine, it is intended to be eventually cut into separate tags; and it is desirable to leave as little waste material as may be at the ends of each tag. By setting the fastening devices in pairs, therefore, the desired end can be accomplished without making provision for a variable feed as would otherwise be necessary. It is obvious in this case that the feed movement corresponds substantially to the length of the tag, and since the fastening devices are set in pairs they can be as close together as desired, although the feed movement is the same at each operation.

What I claim is:

1. In a machine for forming fastening devices, the combination with a reciprocating cutting punch and stationary die; of a pocket positioned to receive the blank cut by the said punch and die, said pocket having shoulders to engage projecting parts of the blank; means for advancing said pocket; and a punch arranged at an angle to the punch first named, said punch approximately fitting the part of the pocket within the shoulders and arranged to be forced therein beyond the shoulders to bend the said projecting parts of the blank.

2. In a machine for forming fastening devices, the combination with a reciprocating cutting punch and stationary die; of a pocket positioned to receive the blank cut by the said punch and die, said pocket having shoulders to engage projecting parts of the blank; a punch arranged at an angle to the cutting punch and approximately fitting the part of the pocket within the shoulders and arranged to be forced therein beyond the shoulders to bend the said projecting parts of the blank; and means for ejecting the blank from the pocket.

3. In a machine for forming fastening devices, the combination with a reciprocating cutting punch and stationary die; of a pocket positioned to receive the blank cut by the said punch and die, said pocket having shoulders to engage projecting parts of the blank; a punch arranged at an angle to the punch first named and approximately fitting the part of the pocket within the shoulders and arranged to be forced therein beyond the shoulders to bend the said projecting parts of the blank; an ejecting punch arranged to enter the pocket from the bottom and eject the blank therefrom; and a reciprocating operating member common to said cutting punch and said ejecting punch.

4. In a machine for forming fastening devices, the combination with a reciprocating male die; of a stationary female die; means for feeding a strip of metal between said dies; a pocket arranged to receive the blank cut by the die; means for moving said pocket from the position in which it has received said blank; and a reciprocating shaping punch adapted to act on said blank in the pocket after it has been moved, said shaping punch being arranged at an angle to said cutting punch.

5. In a machine for forming fastening devices, the combination with a reciprocating cutting punch; of a stationary female die; means for feeding a strip of metal between said cutting punch and die; a rotary carrier having its periphery adjacent to said die and being provided with pockets opening through said periphery, each pocket having shoulders below the periphery of the carrier; a reciprocating shaping punch to enter said pocket from one end and to pass beyond said shoulders; and a reciprocating ejecting punch to enter said pocket from the other end and eject the blank.

6. In a machine for forming fastening devices, the combination with a stationary die; of a reciprocating cutting punch; means for feeding a strip of metal between said dies; a carrier provided with a pocket to receive the cut blank, said pocket having shoulders adapted to support projecting portions of said blank; means for rotating said carrier; a reciprocating shaping punch operating at an angle to said die and arranged to enter said pocket and force the blank therein beyond said shoulders; and an ejecting punch operating in line with the die to eject said blank from the pocket.

7. The combination with a support for a strip of metal; of a female die formed in said support; a rotating carrier below said support, said carrier being provided with a pocket adapted to stand in alinement with said female die; a reciprocating cutting punch to cut the blank and force the same into said pocket; means for rotating said carrier; a reciprocating shaping punch located at another point in the travel thereof, adapted to operate upon the blank in the pocket; and an ejecting punch to enter the said pocket from the rear and eject the blank therefrom.

8. The combination with a rotary annulus having a pocket extending through its periphery; of a stationary female die adjacent to said periphery; a cutting punch movable transversely with relation to said annulus and coöperating with said die to form a blank and deposit it in said pocket; a shaft concentric with said carrier; and a cam on said shaft to operate said punch.

9. The combination with a rotary annulus having a pocket extending through its periphery; of a stationary female die adjacent to said periphery; a cutting punch movable transversely with relation to said annulus and coöperating with said die to form a blank and deposit it in said pocket; an ejecting punch connected with said cutting punch and movable through the pocket to eject the blank; and means for simultaneously operating both punches.

10. The combination with a rotary annulus having a pocket extending through its periphery; of a stationary female die adjacent to said periphery; a cutting punch movable transversely with relation to said annulus and coöperating with said die to form a blank and deposit it in said pocket; a shaping punch movable at an angle to said cutting punch to act on said blank in said pocket; a shaft concentric with said carrier; and cams on said shaft to operate both of said punches.

11. In a machine for forming and affixing fastening devices, the combination with an annular carrier provided with pockets extending through its periphery; of a driving shaft concentric with said carrier; cutting, shaping and ejecting punches movable transversely of said carrier and having cam surfaces connected therewith and extending through the middle of said carrier; cams on said driving shaft to coöperate with said cam surfaces simultaneously; an intermittent gear operated by said shaft to drive a counter shaft at intervals; and means for connecting said counter shaft to said rotary carrier to rotate the same intermittingly between operations of the punches.

12. In a machine for forming fastening devices, a rotary annular carrier externally supported in a frame and having pockets in its periphery; a female die in said frame, means for rotating said carrier to bring said pockets successively in line with said die; a clenching anvil adjacent to the outer surface of said carrier and opposite said female die; a reciprocating member having slide bearings at opposite sides of said frame and a cam surface within said carrier; a cutting punch coöperating with said die; and an ejecting punch, both punches being carried on said member and arranged to enter the pockets at opposite sides of the carrier; and a cam shaft concentric with the carrier and having a cam to operate said member.

13. In a machine for forming fastening devices, a rotary annular carrier externally supported in a frame and having pockets in its periphery; a female die in said frame, means for rotating said carrier to bring said pockets successively in line with said die; a clenching anvil adjacent to the outer surface of said carrier; a reciprocating member; a cutting punch coöperating with said female die; a cutting punch and an ejecting punch arranged to enter the pockets at opposite sides of the carrier; both of said punches being carried on said member; a shaping punch; a second reciprocating member which also extends across the frame at an angle to the reciprocating member first named, and having a cam surface within the carrier; a cam shaft extending through the carrier, said shaping punch being mounted on said second reciprocating member; and cams on said shaft arranged to operate both of said reciprocating members.

14. The combination with a frame and an annular carrier externally supported in said frame and provided with pockets extending through its periphery; of cutting and shaping tools mounted for reciprocation in said frame and coöperating with said pockets; and means for alternately rotating said carrier the distance between said pockets and reciprocating said tools.

15. The combination with a frame and an annular carrier externally supported in said frame and provided with pockets extending through its periphery; of cutting and shaping tools mounted for reciprocation in said frame and coöperating with said pockets; means for alternately rotating said carrier the distance between said pockets and reciprocating said tools; and a retaining device for holding said carrier stationary between the movements thereof.

16. In a machine for forming fastening devices for tags, the combination with a stationary die; of a reciprocating cutting punch; means for feeding a strip of metal between said punch and die; a carrier provided with a pocket to receive the blank cut from the metal by the said punch and die, said pocket having shoulders adapted to receive projecting portions of said blank; a reciprocating shaping punch adapted to enter said pocket and force the blank therein beyond said shoulders to bend said projecting portions and thereby form prongs; means for feeding a strip of fabric past said pocket; and means for ejecting the said cut and shaped blank from said pocket into contact with the fabric and clenching the prongs therein.

17. In a machine for forming and affixing fastening devices, the combination with a stationary die; of a reciprocating cutting punch; means for feeding a strip of metal between said punch and die; a carrier provided with a pocket to receive the blank cut from said strip by the punch and die, said pockets having shoulders adapted to receive projecting portions of said blank; a reciprocating shaping punch adapted to enter said pocket and force the blank therein beyond the shoulders to bend the said projecting portions and form prongs; means for feeding a strip of fabric past said pocket; means for ejecting the said blank from the said pocket with the prongs pointing outward; and a clenching anvil adjacent to said pocket at the opposite side of the pocket to coöperate with the ejecting means in clenching the prongs.

18. In a machine for forming fastening devices and setting them in a strip of fabric to form tags, the combination with an annular carrier provided with pockets extending through its periphery, each pocket having supporting shoulders; of a stationary die located adjacent to the periphery of said carrier; a reciprocating cutting punch coöperating with said die and movable through said die into a pocket in the carrier; means for feeding a strip of metal between said punch and die from which a blank is cut by said punch and die, and forced into said pocket; a reciprocating shaping punch arranged to enter the pocket containing the blank and coöperate with said shoulders to shape the blank with projecting prongs; an ejecting punch movable into the pocket in the opposite direction to eject the blank; a clenching anvil at the outside of the carrier adjacent to said ejecting punch and means for feeding a strip of fabric between said ejecting punch and anvil.

19. In a machine for forming fastening devices and affixing them in a strip of fabric, the combination with an annular carrier provided with pockets extending through its periphery; of a driving shaft concentric with said carrier; cutting, shaping, and ejecting punches movable transversely of said carrier to form the fastening devices and being provided with cam surfaces extending through the middle of the said carrier; cams on said shaft coöperating with said cam surfaces to operate said punches simultaneously; an intermittent gear operated by said shaft; a countershaft driven by said gear; means for connecting said countershaft to said rotary carrier to rotate the same intermittently between operations of the punches; feed rolls for a strip of metal from which the blanks are cut; feed rolls for the fabric in which the fastening devices are secured; and gear connections between said feed rolls and said intermittingly operated shaft.

20. In a machine for forming fastening devices and affixing them in fabric to form tags, the combination with a support provided with feed mechanism for two strips of metal; of a rotary carrier provided with pairs of adjacent pockets; a pair of dies; a pair of cutting punches to coöperate in cutting and depositing the blanks in the adjacent pockets at one operation; a pair of shaping punches; a pair of ejecting punches; clenching anvils adjacent to said ejecting punches; and means for feeding a strip of fabric transversely across the face of the carrier between the ejecting punches and the anvils, whereby two fasteners are ejected at one operation and clenched in the fabric.

In testimony whereof, I have signed my name.

CARLTON W. BROWN.

Copies of this patent may be obtained for five cents each, by addressing the "Commissioner of Patents, Washington, D. C."